Patented Mar. 9, 1926.

1,576,005

UNITED STATES PATENT OFFICE.

WALTHER SCHRAUTH, OF ROSSLAU, GERMANY.

DECOMPOSING FATS, OILS, AND WAXES.

No Drawing.    Application filed April 12, 1924.  Serial No. 706,107.

*To all whom it may concern:*

Be it known that I, WALTHER SCHRAUTH, a citizen of the German Empire, residing at Rosslau, Anhalt, Germany, have invented certain new and useful Improvements in Decomposing Fats, Oils, and Waxes, of which the following is a specification.

The present process refers to decomposing fats or oils or waxes into fatty acids and glycerine. It has been proposed (U. S. A. Patent 601,603 Twitchell) to obtain the separation of fats into glycerine and fatty acids by means of a reagent containing sulphofatty acids. The present process consists in decomposing fats or oils or waxes by means of sulphoacids, in which hydrogen atoms of the nucleus are substituted by hydrocarbon radicles. I have found that the said sulphoacids, especially those containinig a single hydrocarbon radicle derived from secondary fatty alcohols effect the decomposition of fats or oils or waxes quicker than the reagents hitherto proposed and have the further advantage that one needs only very small amounts of the reagent and obtains very pure fatty acids and glycerine.

Suitable sulphoacids for carrying out my process are the sulphoacids derived from polynuclear aromatic hydrocarbons, as for instance naphthalene, anthracene, phenanthrene, in which one atom of hydrogen is substituted by an alkyl, aryl, aralkyl, alicyclic, or oxyalicylic radicle, i. e. the hydroxylic group containing alcylic radicles, as for instance $CH_2OH$. and $CH_2.CHOH.CH_2OH$. or group, especially those derived from secondary alcohols. One may however also use sulphoacids which are derived from benzene. Under the substituted sulphoacids suitable for my invention I understand also such sulphonated acids derived from polynuclear hydrocarbons, in which one nucleus is partly hydrogenated of being well defined chemical compounds which may be purified easily for instance by crystallization either of the free acids or their salts, whereas the hitherto fat decomposing reagents are not well defined chemical compounds and contain by-products or certain amounts of the parent materials, from which they cannot be easily or completely separated. I may use the free sulphoacids, or their salts, as for instance the sodium salts or the sulphoacid derivatives in which the sulphoradicle is preserved, as for instance the sulphoacid chlorides, which compounds are during the decomposing process transformed into the sulphoacids.

Suitable sulphoacids are for instance those of naphthalene, anthracene, phenanthrene substituted by a isopropylic, isobutylic, cyclohexanic group. Other suitable sulphoacids are those of dimethyltetrahydronaphthalene, octohydroanthracene. One may also use the sulphoacids of such aromatic hydrocarbons in which the substituting hydrocarbon groups contain halogens or amino groups.

The sulpho-acids, employed for my process may be prepared according to any of the suitable methods for such purpose, as for instance by sulphonating the aromatic hydrocarbons containing aliphatic residues or by introducing the groups into the sulphoacids by causing primary or secondary alcohols to act on the hydrocarbons in the presence of sulphuric acid or zinc chloride or of another suitable catalytic or dehydrating agent.

*Example 1.*—1 part by weight of cyclohexylnaphthalene sulphoacid is dissolved in 20 parts by weight of water. One adds 0.5–0.6% of the dissolved sulphoacid to 100 parts by weight of the fats to be decomposed which may preferably be molten, if it has originally a solid state, as is the case for instance with tallow. One adds about 0.2% sulphuric acid 60° Bé. and emulsifies preferably the mixture by introducing water or steam. The mixture is heated to boiling and maintained at this temperature during about 12 hours. After this nearly 90% of the fat is decomposed. One may continue with boiling, in adding if required new amounts of the sulphoacids and sulphuric acid. A suitable modification is to drain off then the formed aqueous glycerine, add fresh water, sulphuric acid, and sulphoacid and proceed as described before. In the place of the sulphoacid one may use a salt of it, for instance the sodium salt, in which case one adds such amounts of sulphuric acid that the sulphoacid is formed and about 0.2% free sulphuric are present.

*Example 2.*—One takes the sodium or barium salt of the isopropyl sulpho-acid which salt is obtained by neutralizing the product of the action of sulphuric acid on isoproplynaphthalene with sodium carbonate or barium carbonate, adds the said salt to a mixture of fat and water and adds sufficient sulphuric acid of 60° Bé. that the mixture contains about 0.2% free sulphuric acid. One may also use free sulphoacid, which is prepared by decomposing the barium salt by means of sulphuric acid and separating the liquid from the precipitate. One adds about 0.5 to 0.6% of the sulphoacid, dissolved in 20 parts by weight of water to 100 parts by weight of the fat to be decomposed, preferably in molten or liquid state and adds with 0.2% sulphuric acid of 60° Bé. In the cases cited, one emulsifies preferably by introducing steam. One heats to the boiling temperature and maintains at this temperature during about 12 hours, after which time about 90% of the fat will be decomposed. One adds new amounts of sulphoacids and sulphuric acid and continues with boiling or one drains off the liquid containing aqueous glycerine, adds water, sulphoacid, sulphuric acid and continues with boiling.

*Example 3.*—One adds to the betanaphthalene sulphoacid prepared according to Example 2 in the same manner as indicated in Example 2 a mixture of the methylethylcarbinol and sulphuric acid 66° Bé. The methylethylcarbinol is obtained, for instance, from methylethylacetone by reduction. One proceeds as indicated in Example 2.

In the examples the sulphuric acid as esterifying agent may be substituted by another organic or inorganic acid, as for instance hydrochloric acid. If one uses the free sulphoacids an addition of other acids may be omitted.

From the aqueous layer one may separate the glycerine by any known manner for instance by distillation. The fatty acids may be recovered by extraction or such like.

I claim:—

1. The process of decomposing fats, oils, or waxes by means of sulphoacids which consists in mixing a sulphoacid of aromatic hydrocarbons substituted in the nucleus by one hydrocarbon radicle with the fat to be decomposed and water and heating the mixture so long to the temperature at which the splitting of the fats into fatty acids and glycerine is effected, that the desired degree of splitting of the fat is obtained.

2. The process of decomposing fats, oils or waxes by means of sulphoacids which consists in mixing a sulphoacid of polynuclear aromatic hydrocarbons substituted in the nucleus by one hydrocarbon radicle with the fat to be decomposed and water and heating the mixture so long to the temperature at which the splitting of the fats into fatty acids and glycerine is effected that the desired degree of splitting of the fat is obtained.

3. The process of decomposing fats, oils, or waxes by means of sulphoacids which consists in mixing a sulphoacid of polynuclear aromatic hydrocarbons substituted in the nucleus by one hydrocarbon group derived from secondary fatty alcohols with the fat to be decomposed and water and heating the mixture so long to the temperature at which the splitting of the fats into fatty acids and glycerine is effected that the desired degree of splitting of the fat is obtained.

4. The process of decomposing fats, oils or waxes by means of sulphoacids which consists in mixing a sulphoacid of polynuclear aromatic hydrocarbons substituted in the nucleus by one hydrocarbon group derived from methylethylcarbinol with the fat to be decomposed and water and heating the mixture so long to the temperature at which the splitting of the fats into fatty acids and glycerine is effected that the desired degree of splitting of the fat is obtained.

5. The process of decomposing fats, oils and waxes by means of sulphoacids, which consists in mixing a sulphoacid of plynuclear aromatic hydrocarbons substituted in the nucleus by the isopropyl group with the fat to be decomposed and water and heating the mixture so long to the temperature at which the splitting of the fats into fatty acids and glycerine is effected that the desired degree of splitting of the fat is obtained.

6. The process of decomposing fats, oils or waxes by means of sulphoacids which consists in mixing a sulphoacid of aromatic hydrocarbons substituted in the nucleus by hydrocarbon groups containing besides the sulphonic groups non-acid substituents with the fat to be decomposed and water and heating the mixture so long to the temperature at which the splitting of the fats into fatty acids and glycerine is effected that the desired degree of splitting of the fat is obtained.

In testimony whereof I hereunto affix my signature.

WALTHER SCHRAUTH.